UNITED STATES PATENT OFFICE.

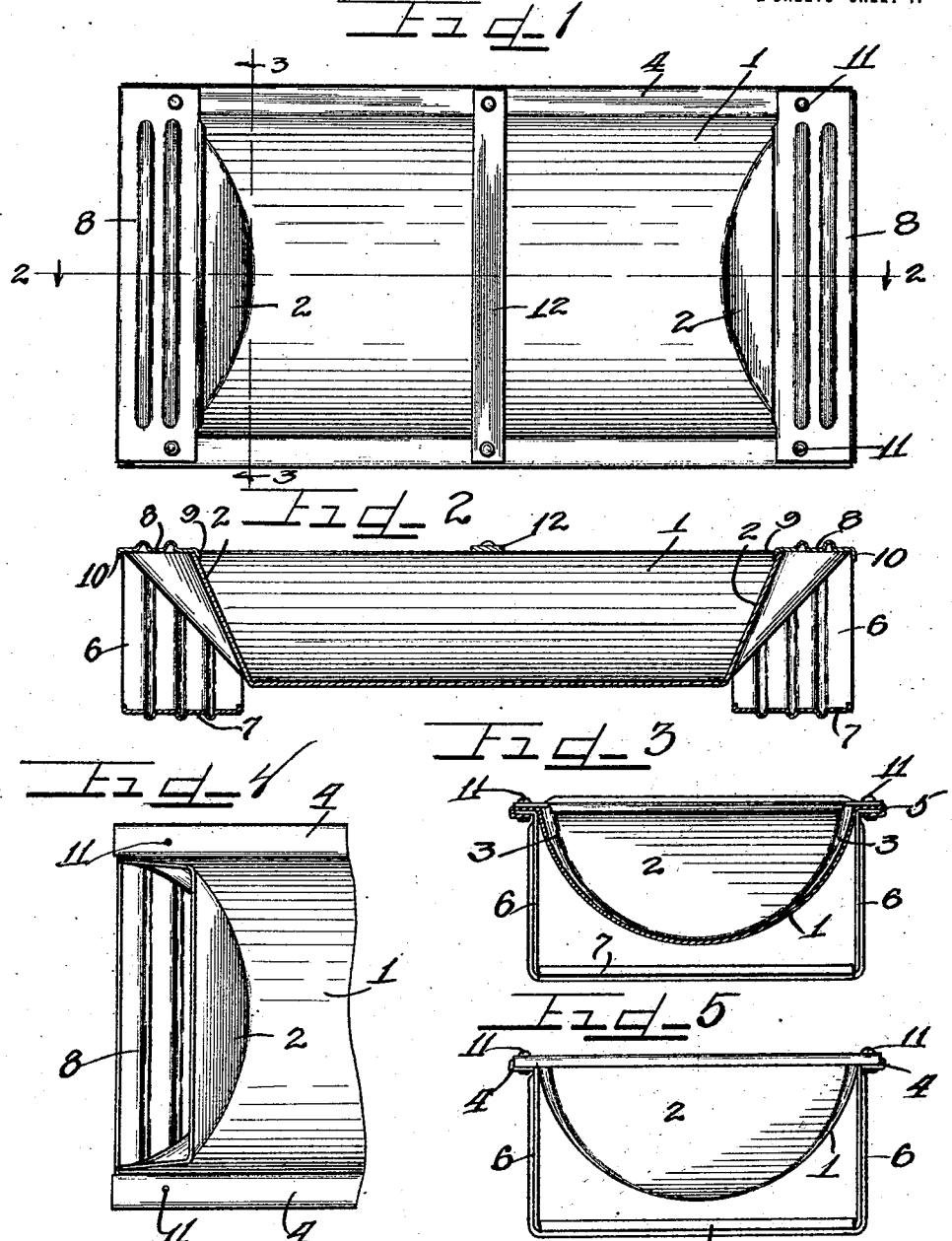

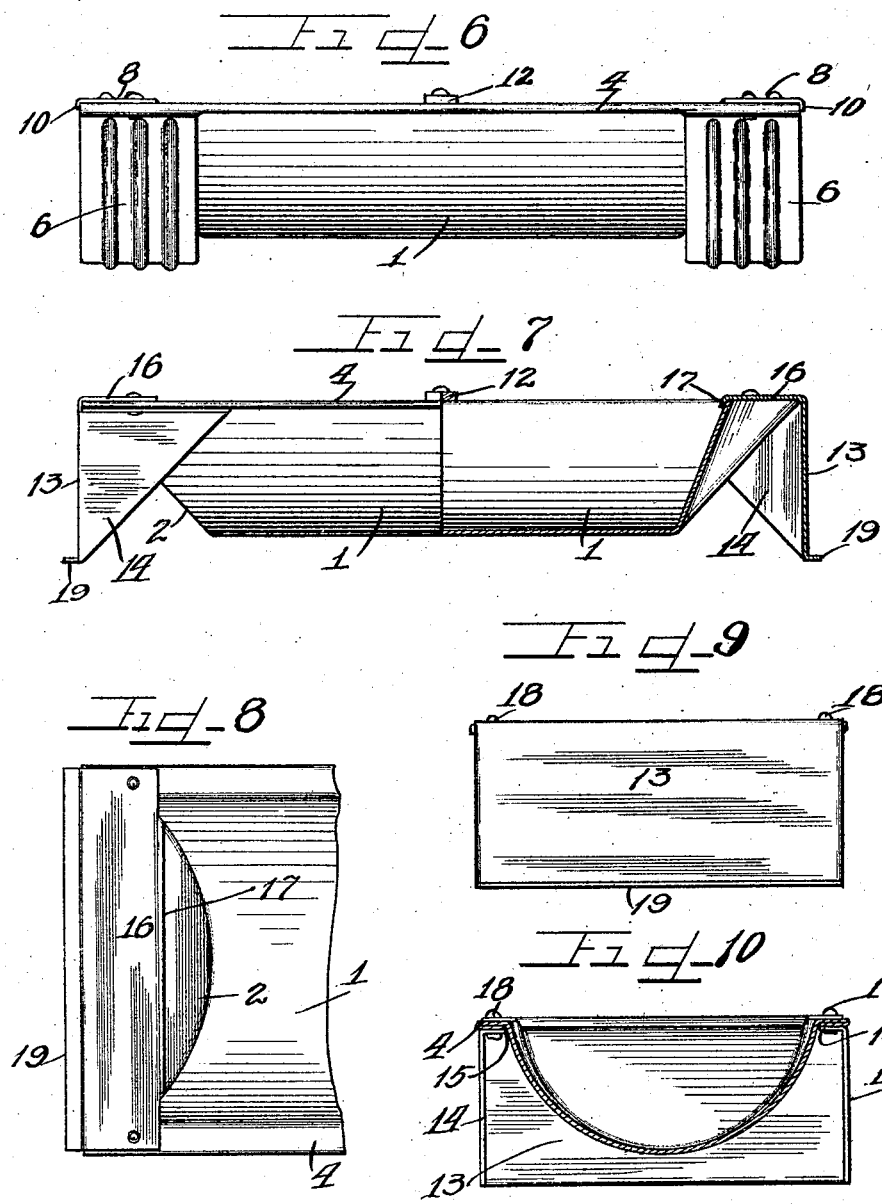

GEORGE G. BAYNE AND JOHN C. HOEHNEN, OF BUSHNELL, ILLINOIS.

TROUGH.

1,418,516.   Specification of Letters Patent.   Patented June 6, 1922.

Application filed January 20, 1921. Serial No. 438,538.

*To all whom it may concern:*

Be it known that we, GEORGE G. BAYNE and JOHN C. HOEHNEN, citizens of the United States, and residents of the city of Bushnell, in the county of McDonough and State of Illinois, have invented certain new and useful Improvements in a Trough; and we do hereby declare that the following is a full, clear, and exact description of the same, reference being had to the accompanying drawings, and to the numerals of reference marked thereon, which form a part of this specification.

This invention relates to improvements in a trough and more particularly to that type of trough which is constructed entirely of stamped metal portions held in fixed relation by riveting, welding, or otherwise. Troughs of the type under consideration are largely used as containers for liquid and semi-liquid foods for animals, and in the construction of the same the factors of strength and durability must necessarily be combined in a construction which may be economically manufactured. It is also desirable that the interior of the trough be easily accessible for cleaning and that there be no recesses in said interior where the feet or legs of the animals may be caught during feeding.

It is therefore an object of this invention to provide a strong durable trough which may be entirely constructed from comparatively thin stamped sheet metal portions.

It is another object of this invention to provide a trough adapted for holding liquid food for animals, said trough being so constructed that the interior thereof is readily accessible for cleaning.

It is a further object of this invention to provide a stamped metal trough having end supporting portions comprising single pieces of stamped metal.

It is an important object of this invention to provide a trough having a body portion constructed of a single piece of comparatively thin sheet metal and having outwardly sloping end portions with flat inner surfaces integrally formed thereon.

Other and further important objects of this invention will be apparent from the disclosures in the drawings and specification.

The invention (in a preferred form) is illustrated in the drawings and hereinafter more fully described.

On the drawings:

Figure 1 is a top plan view of a trough embodying the principles of this invention.

Figure 2 is a section on the line 2—2 of Figure 1.

Figure 3 is a section on the line 3—3 of Figure 1.

Figure 4 is a plan view of one end of the trough with the cover plate removed.

Figure 5 is an end elevation of the trough.

Figure 6 is a side elevation.

Figure 7 is a side elevation with parts in section of a modified form of trough.

Figure 8 is a top plan view showing a fragmentary portion of the modified trough.

Figure 9 is an end elevation of the trough shown in Figure 7, and

Figure 10 is a transverse vertical section thereof.

As shown on the drawings:

The body of the trough of this invention comprises a hollow longitudinal portion 1 which is preferably stamped from sheet metal and which, as shown in Figure 3, is of substantially arcuate cross-section. Integral outwardly sloping flattened end portions 2 are formed on said body portion 1 by forcing the material thereof at the ends of said portions upwardly and inwardly in a press which acts to flatten said end portions 2 and force the material outwardly toward the walls of the longitudinal portion 1 so that only small spaces 3 are left between said end portions and the longitudinal portion 1. This restriction in size of the spaces 3 obviates the danger of the feet of animals being caught therein, and also prevents the accumulation of any considerable portion of food in said spaces. Integrally formed on the longitudinal edges of the member 1 are outwardly extending horizontal flanges 4 and said flanges 4 are turned downwardly and inwardly to form inwardly opening channel members along the edges of the trough, as clearly shown in Figure 3, and engaged in said channel members at each end of the trough are horizontal flanges 5 which extend outwardly from and are integral with corrugated upright portions 6 of end supporting members 7. As shown in the drawings, said end supporting members 7 and the upright portion 6 thereof are preferably formed from a single piece of corrugated stamped material, the corrugations therein adding to the strength and rigidity of said end supporting structures. The top portions of the trough at the ends thereof are engaged by corrugated stamped metal cover plates 8, which are supported on the top of the flanges 4 and the edges of which are bent downwardly at 9 and 10 over the end portion 2 and the upwardly extending member 6. The provision of said corrugated plates 8 adds to the strength of the end supporting structure and also to the transverse rigidity of the trough and in order to secure the structure firmly together rivets 11 are preferably engaged through the ends of said plate and extend downwardly to the horizontal flanges 4 and the horizontal flanges 5 on the upwardly extending member 6. Additional rigidity in the trough structure may be provided by means of transverse braces 12 which extend across the top of the trough intermediate the ends thereof and are riveted to the flanges 4.

In the modified trough construction shown in Figures 7 to 10 inclusive, the end supporting structures are formed from a single piece of stamped metal and comprise transverse upright supporting portions 13 which are provided with side braces 14 which have inwardly bent horizontal portions 15 engaging the under side of the horizontal flanges 4 while inwardly bent horizontal plates 16, integral with said portions 13, form cover plates for the ends of the trough and are provided with downwardly bent portions 17 engaged over the outwardly inclined end member 2. Said end supporting structures are secured to the trough by means of rivets 18 engaged through the cover plates 16 thereon and extending through the horizontal flanges 4 and the horizontal portion 15 of the bracing members 14. In order that said end supporting structures may be conveniently secured to a floor or other supporting surface, the lower ends of the members 13 are provided with outwardly extending integral horizontal flanges 19, as clearly shown in Figures 7 and 8.

It will be apparent from the foregoing specification that this invention provides a trough which may be economically manufactured entirely from stamped metal sections, and that a minimum number of fastening devices are necessary to secure said sections together. The provision of the flat outwardly sloping end in conjunction with the semi-cylindrical trough member provides a trough having a smooth interior which is easy to keep clean and in which there is no opportunity for the feet or legs of the animals feeding therefrom to be caught. It is of course understood that the rivets which are used for securing various portions together may be entirely dispensed with and electric welding, crimping or other suitable means employed in lieu thereof.

We are aware that numerous details of construction may be varied through a wide range without departing from the principles of this invention, and we therefore do not purpose limiting the patent granted otherwise than necessitated by the prior art.

We claim as our invention:

A sheet metal trough comprising a semi-cylindrical body, oblique plane end portions, the sides of said body projecting beyond said plane end portions, connecting metal between said end portions and said body comprising parts nearly parallel to the sides of said body and being close to said sides where said sides project beyond said plane end portions, all constituting one integral piece of sheet metal, a flange integral with the side edges of said body, supporting means extending across the end of the body beneath the same, reinforcing means extending across and covering the upper edges of the end portions, and common securing means fastening said reinforcing means and said support to said flange, the flange being folded around the edge of said supporting means.

In testimony whereof, we have hereunto subscribed our names in the presence of two subscribing witnesses.

GEORGE G. BAYNE.
JOHN C. HOEHNEN.

Witnesses:
G. K. COOPER,
H. H. TUCK.